March 2, 1965     L. D. HAGENBOOK     3,171,538
ELEVATING CONVEYOR
Filed Oct. 3, 1962                               3 Sheets-Sheet 1
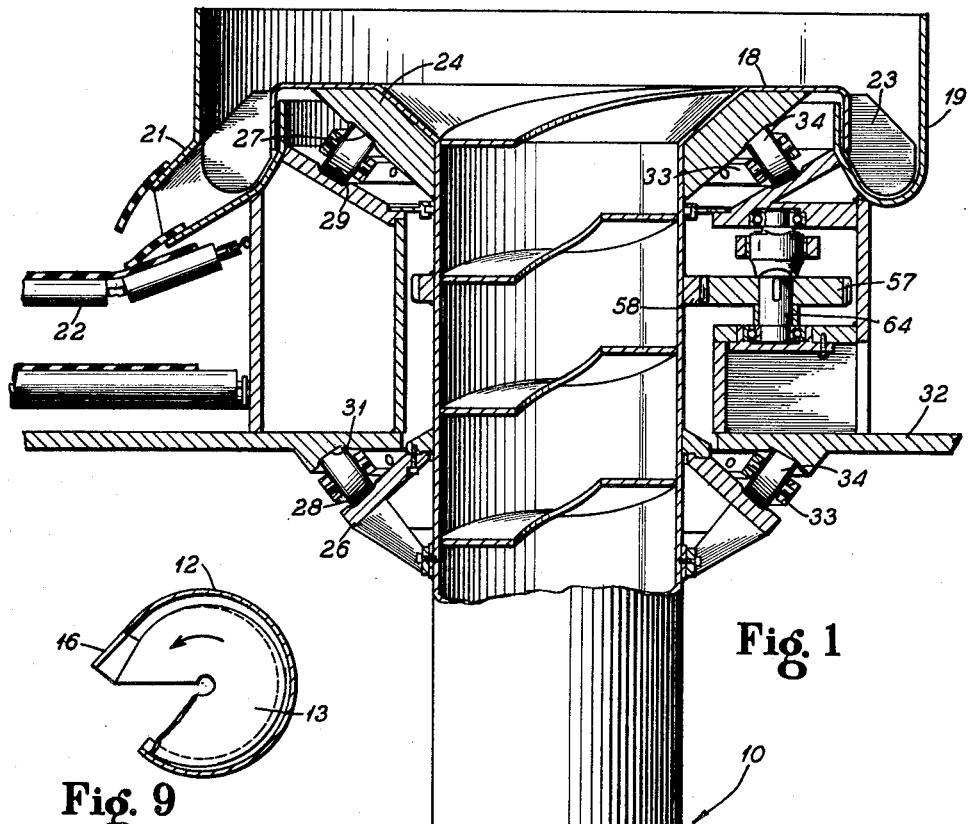
Fig. 1
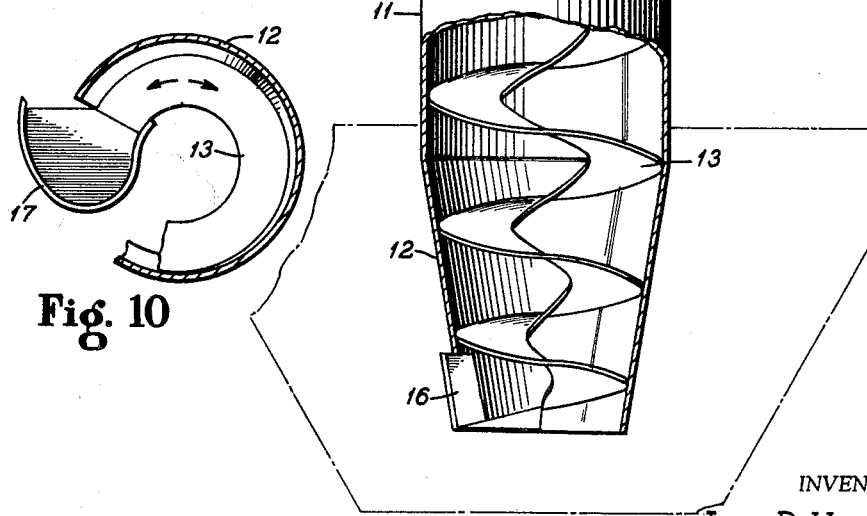
Fig. 9
Fig. 10
INVENTOR.
Loy D. Hagenbook
BY Herman E. Smith
ATTORNEY March 2, 1965

L. D. HAGENBOOK 3,171,538

ELEVATING CONVEYOR

Filed Oct. 3, 1962

INVENTOR.
Loy D. Hagenbook

BY Herman E. Smith

ATTORNEY

March 2, 1965     L. D. HAGENBOOK     3,171,538
ELEVATING CONVEYOR
Filed Oct. 3, 1962     3 Sheets-Sheet 3
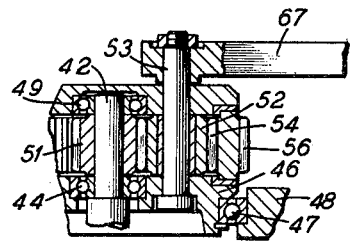
Fig. 4
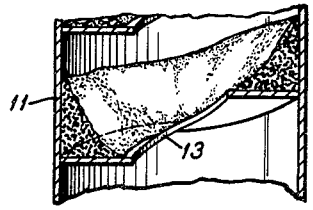
Fig. 7
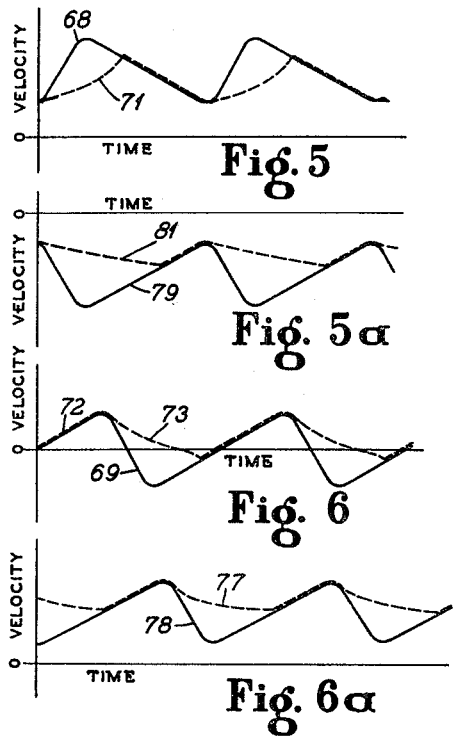
Fig. 5
Fig. 5a
Fig. 6
Fig. 6a
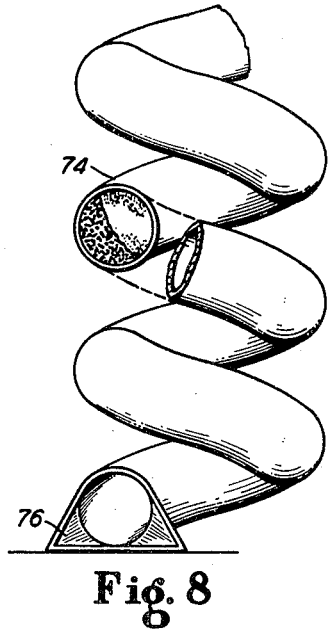
Fig. 8
INVENTOR.
Loy D. Hagenbook
BY Herman E. Smith
ATTORNEY

United States Patent Office 3,171,538
Patented Mar. 2, 1965

3,171,538
ELEVATING CONVEYOR
Loy D. Hagenbook, Chicago, Ill., assignor to Goodman Manufacturing Company, Chicago, Ill., a corporation of Illinois
Filed Oct. 3, 1962, Ser. No. 228,072
14 Claims. (Cl. 198—213)

This invention relates to elevating conveyors and more particularly to conveyors in which bulk material is moved vertically by means of an accelerated spiral ramp.

A principal object of the present invention is to provide an elevating conveyor in which bulk material is caused to move upward or downward by means of controlled angular acceleration of the conveyor body. Another object is to provide an elevating conveyor in which bulk material is held against slipping downward by means of centrifugal force against an enclosing surface. Another object is to provide a rotating conveyor in which the rotation is characterized by cycles of controlled acceleration and retardation. A further object is to provide a conveyor having periods of angularly accelerated and retarded movement in which the direction of motion of the conveyor body is reversed during the cycle. A still further object is to provide a conveyor having a trough extending outwardly at increasing radii as it extends upwardly about a rotational axis. These and other objects and advantages of the invention will become apparent from the following detailed description together with the drawings.

In the drawings:

FIGURE 1 is a front elevation view of the conveyor of the present invention with portions broken away to show the interior thereof;

FIG. 4 is a fragmentary section view of a portion of the drive gearing taken along the line 4—4 of FIG. 2;

FIG. 5 is a schematic diagram showing a plot of instantaneous velocities of the conveyor and material for a form of accelerated motion for raising material;

FIG. 5a is similar to FIG. 5 and illustrates instantaneous velocity profiles for lowering material;

FIG. 6 is a schematic diagram showing instantaneous velocities for another form of accelerated motion;

FIG. 6a shows a variation of the form of motion shown in FIG. 6;

FIG. 7 is a fragmentary elevation view of the conveyor body and guide showing material disposed thereon under the combined influence of centrifugal force and the force of gravity;

FIG. 8 is an elevation view of another form of the conveyor in which the body is provided by a helical tube;

FIG. 9 is a plan view of a scoop for directing material from a bin or pile to the interior of the conveyor; and FIG. 10 is similar to FIG. 9 showing a scoop having a re-entrant profile.

Figure 2:
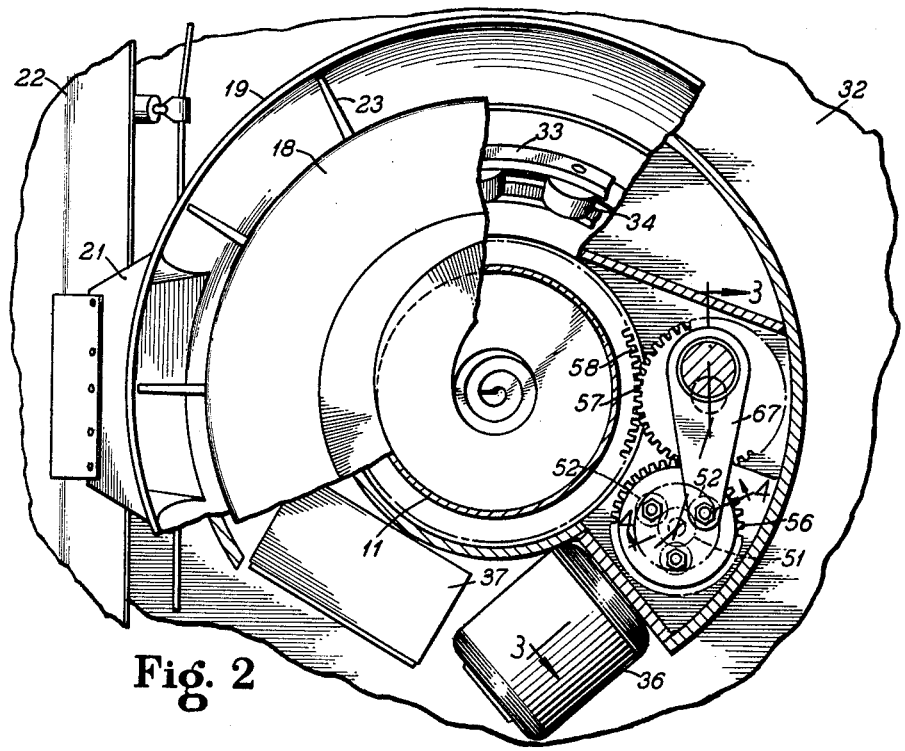
FIG. 2 is a plan view of the conveyor of FIG. 1 with portions broken away to show the conveyor driving mechanism.

Referring now to the drawings and particularly to FIG. 1 thereof, the reference numeral 10 generally indicates an elevating conveyor for moving material such as coal, grain, ore and the like upward from a lower level to a higher level as in unloading barges and hoppers or moving process ingredients from one level to another.

The body of the conveyor is shown as a hollow cylinder 11 which may also be conical in shape, in whole or in part, as shown at 12. Where space limitations permit, the use of a conical body results in more efficient movement of material as a result of the action of centrifugal force. The body 11, 12, whether cylindrical or conical, has an internal helical guide 13 secured thereto for movement together as a unit, the body and guide forming a curved channel. The bottom of body 12 and guide 13 is terminated in a scoop 16 for directing loose material onto guide 13 interior of body 12. An alternate form of scoop having a re-entrant profile is shown in FIG. 10 and designated 17. Scoop 16 is provided for the case where body 12 is rotated continuously in a counter clockwise direction as viewed in FIG. 9, and scoop 17 is provided for the case where body 12 is slowly accelerated in a clockwise direction and quickly retarded in a counter clockwise direction as viewed in FIG. 10.

The upper portion of guide 13 is faired out into a top surface 18 which conducts material over the conveyor driving and supporting mechanism to an annular chamber 19 communicating with spout 21. Spout 21 directs the material into a suitable haulage means such as belt conveyor 22. For the case in which the conveyor body 11 is rotated continuously in a counter clockwise direction as viewed in FIG. 9, scraper paddles 23 are attached to top surface 18 for moving material around chamber 19 to spout 21. Where it is desired to effect movement of the material by means of angular oscillation instead of rotation, the upper portion of body 11 may be modified to provide a spiral wall or eccentrically disposed annular wall mounted on top surface 18 for directing material to spout 21.

Supporting members for body 11 are formed of conical members 24 and 26 having wheel races 27 and 28 extending therearound. Related wheel races 29 and 31 are located on a supporting platform 32 such as the upper floor of a building. A cage 33 of conical wheels 34 is mounted between each pair of wheel races 27, 29 and 28, 31, the upper cage of wheels bearing the weight of the conveyor body while the lower cage resists external forces on the bottom of the conveyor tending to move it laterally or axially upward.

Figure 3:
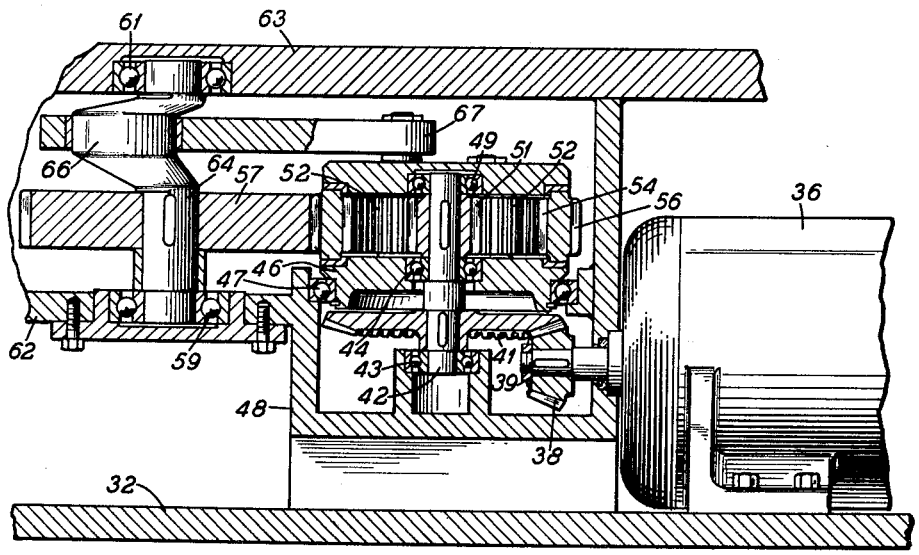
FIG. 3 is a section view of the conveyor driving mechanism taken along the line 3—3 of FIG. 2.

Referring to FIGS. 2, 3 and 4, a driving means is shown for providing varying angular velocity to the conveyor from a constant speed driving motor 36. Other forms of drive means will be suggested to those skilled in the are including varying the speed of motor 36 as by controller 37 or the use of shaker conveyor drive mechanism in combination with a geared transmission for providing unequal periods of acceleration and retardation.

Motor 36 and controller 37 are mounted on supporting platform 32. Bevel pinion 38 is mounted on motor shaft 39 and meshes with bevel gear 41. Bevel gear 41 is mounted on shaft 42 which is supported by bearings 43 and 44. Bearing 44 is mounted in planet gear spider 46 which in turn is mounted on bearing 47. Bearings 47 and 43 are mounted in frame member 48 supported on platform 32. The upper portion of planet gear spider 46 is aligned on shaft 42 by means of bearing 49. A spur pinion 51 is also mouned on shaft 42 between bearings 44 and 49. Spur pinion 51 meshes with planet pinions 52 mounted on shaft 53 in spider 46. Planet pinions 52 drive internal ring gear 54 which is rotatably secured to external ring gear 56. External ring gear 56 meshes with spur gear 57 which in turn drives the conveyor body 11 by means of gear 58. Spur gear 57 is mounted on shaft 4 having a crank throw 66 therein and supported in bearings 59 and 61 in supports 62 and 63. Crank throw 66 drives a connecting arm 67 which extends to shaft 53 in planetary spider 46.

Assuming that motor 36 is turning at constant speed, then bevel pinion 38, bevel gear 41, shaft 42 and spur pinion 51 also rotate at constant speed. As spur pinion 51 rotates at constant speed in mesh with planet gears 52, internal and external ring gears 54 and 56 are caused to rotate. External ring gear 56 drives gear 57 which revolves crank 66 to reciprocally drive arm 67. Arm 67 drives planet spider 46 in an oscillatory path causing planet gears 52 to move relative to spur gear 51. When gears 52 travel in the same direction as gear 51, the speed of ring gear 54 is decreased below its average speed and when gears 52 travel opposite to the direction of gear 51, the speed of ring gear 54 is increased above average. The above and below average speed of ring gear 54 causes gear 57 and crank 66 to turn at varying speeds which in turn drives arm 67 and spider 46 at varying speeds. The varying speed of spider 46 further modifies the speed of ring gear 54. Thus is provided mechanical feed back mechanism for producing wide variation in the instantaneous velocities of gears 57 and 58 and conveyor body 11. The profile of the instantaneous velocities provided by the above-described mechanism will vary depending upon selection of gear ratios, crank radius, and orientation of the axis of arm 67 with respect to the line of centers of gears 51 and 57. A pair of desirable instantaneous velocity profiles are illustrated by solid lines 68 and 69 in FIGS. 5 and 6. Line 68, in FIG. 5, illustrates the case where the conveyor body 11 and guide 13 are periodically accelerated from a minimum speed to a higher speed at a rapid rate and then retarded or decelerated to the minimum speed at some different rate. As shown in FIG. 5, the increase in speed from minimum to maximum occurs in one period of time and the retardation back to minimum speed occurs over another and longer period of time. FIG. 6 illustrates another application of varying conveyor speed in which, according to solid line 69, the conveyor body is slowly accelerated from a maximum speed in the reverse direction through zero to a maximum speed in the forward direction and then quickly retarded through zero to maximum speed in the reverse direction again.

In operation, the conveyor body 11 and guide 13 provide a V-shaped trough or channel for conducting the material to be conveyed. The material is simultaneously pulled downward by gravity and thrown outwardly by centrifugal force as shown in FIG. 7. The centrifugal force, together with the coefficient of friction, creates a frictional force between the material and the inner wall of body 11, tending to resist relative motion between the material and body 11. Similarly, the force of gravity and the coefficient of friction create a frictional force resisting relative motion between the material and guide 13. While it would be more accurate to speak in terms of a single force resulting from the vectorial addition of the force of gravity and centrifugal force, the discussion is rendered clearer by speaking of them separately, particularly since the force of gravity remains constant while the centrifugal force varies with conveyor speed.

As viewed in FIG. 5, assume that the material and conveyor body are rotating together at the same angular velocity represented by the intersection of broken line 71 and solid line 68 with the velocity ordinate. Assume further that the mass of conveyor body 11 and guide 13 are accelerated according to the plot of instantaneous velocities indicated by the initial portion of solid line 68. The force of acceleration is made greater than the force of friction, thereby causing relative movement to occur between the V-shaped conveyor channel and the material. As this relative movement occurs, the material slides circumferentially around body 11 and is forced uphill along helical shelf 13.

The force of friction is expended in increasing the velocity of the material which increases the centrifugal force which in turn increases the friction. This is illustrated by the instantaneous velocity profile for the material shown by broken line 71 in FIG. 5 where it is apparent that the steeply increasing character of line 71 would result in the material catching up with the conveyor body after a short interval of time. Since area under a velocity-time curve represents distance, it is apparent that the area between lines 68 and 71 represents the relative distance traveled by the material with respect to the conveyor measured circumferentially. In short, the conveyor is speeded up more rapidly than the material, with the result that the material is left behind. In being left behind, the material travels circumferentially relative to the conveyor and in so doing is forced upward by the helical disposition of guide 13.

Another application of the principle is shown in FIG. 6 which illustrates the case where the conveyor and material are slowly accelerated together as indicated by the concurrence of solid line 69 and broken line 73 at 72. After the material and conveyor reach some desired maximum speed, the conveyor is rapidly brought to a stop and reversed in direction with the result that the inertia of the material causes it to slide uphill. In FIG. 6, area between lines 73 and 69 represents relative distance traveled by the material with respect to the conveyor. Area under lines 72, 73 above the abscissa represents absolute distance traveled by the material in the desired direction for upward movement, and area bounded by line 73 and the abscissa below the abscissa represents absolute distance traveled by the material in the wrong direction. It is apparent then that a net gain in distance traveled is realized so long as the area above the abscissa is greater than the area below the abscissa in the form of motion shown in FIG. 6. While the form of conveyor motion shown in FIG. 6 is illustrated as being symmetrically disposed about the abscissa and therefore oscillatory in nature, it is more efficient to operate with an instantaneous velocity profile shifted upwardly with respect to the abscissa as shown in FIG. 6a. Such an upwardly shifted velocity profile provides greater area between broken line 77 and the abscissa indicating greater absolute movement of the material. Where solid line 78, representing conveyor velocity, lies entirely above the abscissa as in FIG. 6a, the conveyor motion is rotational.

Although the above description has been rendered in terms of moving material upward, it should be noted that the principles apply to the controlled downward movement of material as well. For example, a device for controlled downward movement of material can be provided by reversing the inclination of the helical guide or the inclination of the guide can remain the same if the direction of movement is reversed. FIG. 5a illustrates the case of keeping the inclination of the guide the same and reversing the direction of movement. Solid line 79 denotes the instantaneous velocity of the conveyor body and broken line 81 represents the instantaneous velocity of the material. It should be noted that line 81 has a shallower gradient than line 71, with which it is comparable, because in the case of moving material downward the force of friction between the material and guide is less than when moving material upward. This is because the material bears on the guide throughout the cycle when it is being lifted and may come out of contact with the guide when being lowered.

While a group of desirable velocity profiles have been described, it is apparent that other forms of motion may be used observing the principle that the conveyor and material are to be moved together during part of a cycle and slid relative to each other during another part of the cycle.

FIG. 8 shows another form of curved conveyor channel provided by tube 74 wrapped around an upright axis in an upwardly ascending helical path. Such tubular channel may replace the trough formed by hollow cylinders 11 and shelf 13. The lower end of tube 74 has a scoop 76 for gathering material and directing it into the tubular trough.

While a preferred embodiment of the invention has been shown and described in the accompanying description and drawings, it will be understood that other forms of the invention may be practiced within the spirit and scope of the following claims.

I claim:
1. An elevating conveyor comprising:
   a curved channel disposed in an ascending path around an upright axis;
   means restraining said channel against movement along said axis while permitting angular movement perpendicular to said axis; and
   drive means connected to said channel effective to drive said channel in periodic cycles of acceleration and deceleration about said axis in a plane perpendicular thereto.

2. An elevating conveyor according to claim 1 in which said curved channel is formed by an upright hollow cylinder having a helical shelf disposed around the interior thereof.

3. An elevating conveyor according to claim 1 in which said curved channel is formed by a helical tube.

4. An elevating conveyor according to claim 1 in which the radius of said curved channel increases outwardly as its path ascends upwardly.

5. An elevating conveyor according to claim 1 in which the lower portion of said channel carries means for gathering material exterior of said channel and transferring said material to said channel.

6. An elevating conveyor for moving material from a lower to a higher elevation comprising:
   a body having a guide which encircles an upright axis in an ascending path;
   a supporting platform for said body;
   bearing means disposed between said body and platform securing said body against axial displacement relative to said platform while permitting rotation of said body relative thereto;
   means for rotating the body and guide continuously in one direction about the axis; and
   means for varying the rotational speed of the guide to cause material carried thereby to slide up the guide responsive to the variation of speed.

7. An elevating conveyor for moving material upwardly comprising:
   a body having a conveyor trough which encircles an upright axis in an ascending helical path;
   a supporting platform for said body;
   bearing means securing said body against axial displacement relative to said platform while permitting rotation of said body relative thereto;
   means for rotating the body continuously in one direction about the axis to urge material in the trough toward the outside thereof by centrifugal force; and
   means for varying the rotational speed of the body above a predetermined minimum speed to cause the material to slide up the trough responsive to the variation of speed.

8. An elevating conveyor for moving material from a lower to a higher elevation comprising:
   a body having a guide which encircles an upright axis in an ascending path;
   a supporting platform for said body;
   bearing means between said platform and body securing said body against axial displacement relative to said platform while permitting rotation of said body relative thereto;
   means for rotating the body and guide continuously in one direction about the axis; and
   means for accelerating and decelerating the rotation of said guide to vary the rotational speed above a predetermined minimum speed to cause material thereby to slide up the guide responsive to the variation of speed.

9. An elevating conveyor for moving material upwardly comprising:
   a body having a guide which encircles an upright axis in an ascending path;
   a supporting platform for said body;
   bearing means between said platform and body securing said body against axial displacement relative to said platform while permitting rotation of said body relative thereto;
   means for rotating the body and guide continuously in one direction about the axis; and
   means for periodically accelerating the rotation of said guide above a predetermined minimum speed to cause material carried thereby to slide up the guide progressively responsive to the periodic acceleration.

10. An elevating conveyor for moving material upwardly comprising:
    a body having a guide which encircles an upright axis in an ascending path;
    a supporting platform for said body;
    bearing means between said platform and body securing said body against axial displacement relative to said platform while permitting rotation of said body relative thereto;
    means for rotating the body and guide continuously in one direction about the axis; and
    means for periodically decelerating the rotation of said guide above a predetermined minimum speed to cause material carried thereby to slide up the guide progressively responsive to the periodic deceleration.

11. An elevating conveyor comprising:
    a curved channel disposed in an ascending path about an upright axis;
    means restraining said channel against movement along said axis while permitting angular movement perpendicular to said axis; and
    drive means connected to said channel, effective to oscillate said channel with unequal periods of acceleration and deceleration in a plane perpendicular to said axis.

12. An elevating conveyor comprising:
    a curved channel disposed in an ascending path about an upright axis;
    means restraining said channel against movement along said axis while permitting angular movement perpendicular to said axis; and
    drive means connected to said channel, effective to oscillate said channel with periodic cycles of low acceleration and rapid retardation in a plane perpendicular to said axis.

13. An elevating conveyor according to claim 12 having a material engaging scoop adjacent the lower portion of said channel, said scoop having a re-entrant profile.

14. An elevating conveyor for moving material upwardly comprising:
    a curved channel disposed in an ascending path around an upright axis of rotation;
    supporting means for said channel including a thrust bearing mounted to resist axial movement of said channel while permitting rotation thereof; and
    drive means connected to said channel, effective to rotate said channel in periodic cycles of acceleration and deceleration, said drive means including a crank and a planetary gear set, said planetary gear set having an input sun gear, an oscillatable planet gear, and an output ring gear, said output ring gear connected in driving relationship to both said channel and said crank while said crank is connected to said planet gear for oscillation thereof whereby the speed of said ring gear is modified by the oscillation of said planet gear which is dependent upon motion fed back from the ring gear through the crank.

References Cited by the Examiner

UNITED STATES PATENTS

| | | | |
|---|---|---|---|
| 1,458,850 | 6/23 | Rath | 198—213 |
| 2,535,050 | 12/50 | Devol. | |
| 2,664,190 | 12/53 | Vesper | 198—215 |
| 2,800,029 | 7/57 | Vail | 74—49 |

FOREIGN PATENTS 695,938  9/40  Germany.

OTHER REFERENCES

Affiliated Manufacturers Inc. Publication, Oct. 15, 1958, Micro-Feeder (four pages).

SAMUEL F. COLEMAN, *Acting Primary Examiner.*
WILLIAM B. LA BORDE, ERNEST A. FALLER, Jr.,
*Examiners.*

UNITED STATES PATENT OFFICE
CERTIFICATE OF CORRECTION

Patent No. 3,171,538                          March 2, 1965

Loy D. Hagenbook

It is hereby certified that error appears in the above numbered patent requiring correction and that the said Letters Patent should read as corrected below.

Column 6, line 5, after "material" insert -- carried --.

Signed and sealed this 27th day of July 1965.

(SEAL)
Attest:

ERNEST W. SWIDER                         EDWARD J. BRENNER
Attesting Officer                             Commissioner of Patents